US012613183B2

(12) United States Patent
Zhu et al.

(10) Patent No.: US 12,613,183 B2
(45) Date of Patent: Apr. 28, 2026

(54) METHOD AND APPARATUS FOR MULTI-MODAL POLARIZATION HOLOGRAPHIC SPECTROMETRY FOR MATERIAL ANALYSIS

(71) Applicant: The University of Hong Kong, Hong Kong (CN)

(72) Inventors: Yanmin Zhu, Hong Kong (CN); Yin Mun Edmund Lam, Hong Kong (CN)

(73) Assignee: University of Hong Kong, Hong Kong (CN)

( * ) Notice: Subject to any disclaimer, the term of this patent is extended or adjusted under 35 U.S.C. 154(b) by 153 days.

(21) Appl. No.: 18/778,705

(22) Filed: Jul. 19, 2024

(65) Prior Publication Data

US 2025/0035538 A1     Jan. 30, 2025

Related U.S. Application Data

(60) Provisional application No. 63/516,228, filed on Jul. 28, 2023.

(51) Int. Cl.
G01N 21/21          (2006.01)

(52) U.S. Cl.
CPC ..... G01N 21/21 (2013.01); G01N 2201/0612 (2013.01); G01N 2201/0635 (2013.01); G01N 2201/0636 (2013.01)

(58) Field of Classification Search
CPC .......... G01N 21/21; G01N 2201/0612; G01N 2201/0635; G01N 2201/0636
See application file for complete search history.

(56) References Cited

U.S. PATENT DOCUMENTS

| | | | |
|---|---|---|---|
| 7,649,660 | B2 | 1/2010 | Adibi et al. |
| 2016/0011050 | A1 | 1/2016 | Skauli |
| 2016/0011353 | A1 | 1/2016 | Escuti et al. |
| 2023/0176390 | A1* | 6/2023 | Lin ........................ G02B 27/10 359/1 |

FOREIGN PATENT DOCUMENTS

| | | |
|---|---|---|
| CN | 104198040 A | 12/2014 |

* cited by examiner

*Primary Examiner* — Jamil Ahmed
(74) *Attorney, Agent, or Firm* — Leason Ellis LLP

(57) ABSTRACT

A two-dimensional spectrum recording apparatus has a source of collimated laser light impinging on a sample on a plate. The light passing through the sample forms an object wave and the light not passing through the sample forming a reference wave, which interfere with each other to form a holographic image at the plate. A beam splitter receives the collimated laser light from the sample and forms separate first and second light beams. A linear polarizer receives the first beam and passes it to a polarization camera having a Full Stokes mask. The camera records the light that passes through the Stokes mask. A slit aperture receives the second beam and transforms it into a slit of light that is applied to a diffraction grating. A diode array receives the second beam from the diffraction grating and forms a light spectrum that is recorded.

6 Claims, 8 Drawing Sheets
(7 of 8 Drawing Sheet(s) Filed in Color)

METHOD AND APPARATUS FOR MULTI-MODAL POLARIZATION HOLOGRAPHIC SPECTROMETRY FOR MATERIAL ANALYSIS

CROSS-REFERENCE TO RELATED PATENT APPLICATIONS

This application claims the benefit of priority under 35 U.S.C. Section 119 (e) of U.S. Application No. 63/516,228, filed Jul. 28, 2023, which is incorporated herein by reference in its entirety.

FIELD OF THE INVENTION

The present invention relates to a multi-modal polarization holographic spectrometer that can examine the biochemical, physical and morphological features of detected samples, simultaneously.

BACKGROUND OF THE INVENTION

Non-invasive, discriminative sample and material analysis without the need for labels or extensive sample preparation is highly required for biomedical, environmental and chemical research. Material analysis and characterization by spectroscopy are accurate but slow. The spectrum signal needs to be recorded pixel-by-pixel, which is time-consuming. The time redundancy cannot promise high-throughput material identification.

Morphological and structural features are related to the composition of the samples and are related to the weathering and the transferring process of the sample objects. The morphological features can be precisely observed by microscopy, i.e., scanning electron microscopy (SEM). However, these features, such as circularity, are non-discriminative and vary with the production process.

Polarization images recorded by current polarization imaging (PI) systems are clumsy and troublesome. The manual rotation and adjustment of the polarizer are needed and limit the use for real-time and automatic imaging processes. Chinese Patent No. CN104198040A discloses a system that needs two laser light sources with different wavelengths. The polarization image recording requires the modulation of the light beams of both lasers. The methods disclosed in this patent cannot record the spectrum as well as capture the material-related spectrum information. Also, there is no automatic imaging process or machine learning-based feature analysis method in this patent.

US Published Application 2016/0011050A1 discloses the use of a polarizer and analyzer to identify the difference introduced by the sample. Manual rotation is required for image recording, which is troublesome and reduces the image recording speed. Further, a specially designed retarder element is required for this patent to implement its function. This retarder element needs to be precisely manufactured, which limits the industrial production of the system and method. U.S. Pat. No. 7,649,660 seeks to achieve high-throughput spectrum recording by holographic multiplexing, as opposed to recording rich information on holograms and spectrums for material identification with high accuracy and multi-modal imaging. No polarization information of the specimen can be recorded by the system and method of this patent.

SUMMARY OF THE INVENTION

In order to solve the problems of the prior art the present invention proposes an apparatus and method that achieves high-throughput two-dimensional (2D) spectrum recording. Compared with the widely used Raman spectroscopy and Fourier transform infrared spectroscopy (FT-IR), the present invention records the 2D spectrum in both x- and y-axis directions. The time efficiency is significantly improved by this strategy.

The invention uses polarization holography that encodes holographic patterns by spatial coherence with polarized light. By separating and filtering the overlapped holograms in the frequency domain, the morphological surface and 3-dimensional stereo-structure of the sample can be retrieved. In addition, sample birefringence properties can be analyzed by polarization holography with optical polarization axis azimuth and phase retardance. The absorption spectrum reveals the structure and composition of the materials. The position and intensity of the absorption peaks in the spectrum indicate the presence of particular molecular structures or functional groups. Overall, the system and method of the present invention offer an advanced and discriminative multi-model material analysis tool.

Polarization features, such as birefringence and anisotropy, are extracted and calculated for the complementary morphological features. In addition, the refractive index, transmittance and fringe contrast are acquired by holographic imaging with the holograms. Rich physical and structural information is collected by the system and provides discriminative features for sample material identification.

Further, synthetic polarization imaging recording is enabled in the system hardware with a multi-directional polarization recording mask. Advanced image configuration and registration methods are used to clarify the images with specific polarization states. No extra optical polarization analyzer is needed, which eliminates the troublesome manual hardware adjustment and allows for automatic imaging. Also, the apparatus and method of the present invention eliminate the field-of-view and light source intensity restrictions of prior spectroscopy systems and add phase and molecular structural characters with PI and digital holography (DH). The system is integrated into the advanced electric imaging sensor hardware and implemented by advanced image processing methods, offering multi-dimensional fingerprints for real-time material analysis.

This invention has a wide range of application areas, involving biomedical research, material science, environmental assessment, and biophysics analysis. For example, microplastics probing for ocean pollution monitoring, biological tissue diagnosis for cancer research, chemical and biological agent detection, semiconductor material examination with defect orientation detection, etc.

The system hardware setup of the present invention is relatively simple and compact. A specifically manufactured polarization mask is mounted inside the imaging sensor and cannot be easily seen by outside observation. This novel design and particular innovation improve the system's compactness and reduce the system cost, making it suitable for commercial and industrial use. In addition, advanced image registration, feature extraction, and processing methods and algorithms are integrated into the invention. Thus, this invention is a composite system in the form of an intelligent tool that exceeds the limitations of single imaging and spectroscopy systems.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The foregoing and other objects and advantages of the present invention will become more apparent when considered in connection with the following detailed description and appended drawings in which like designations denote like elements in the various views, and wherein.

DETAILED DESCRIPTION OF THE INVENTION

Figure 1A:
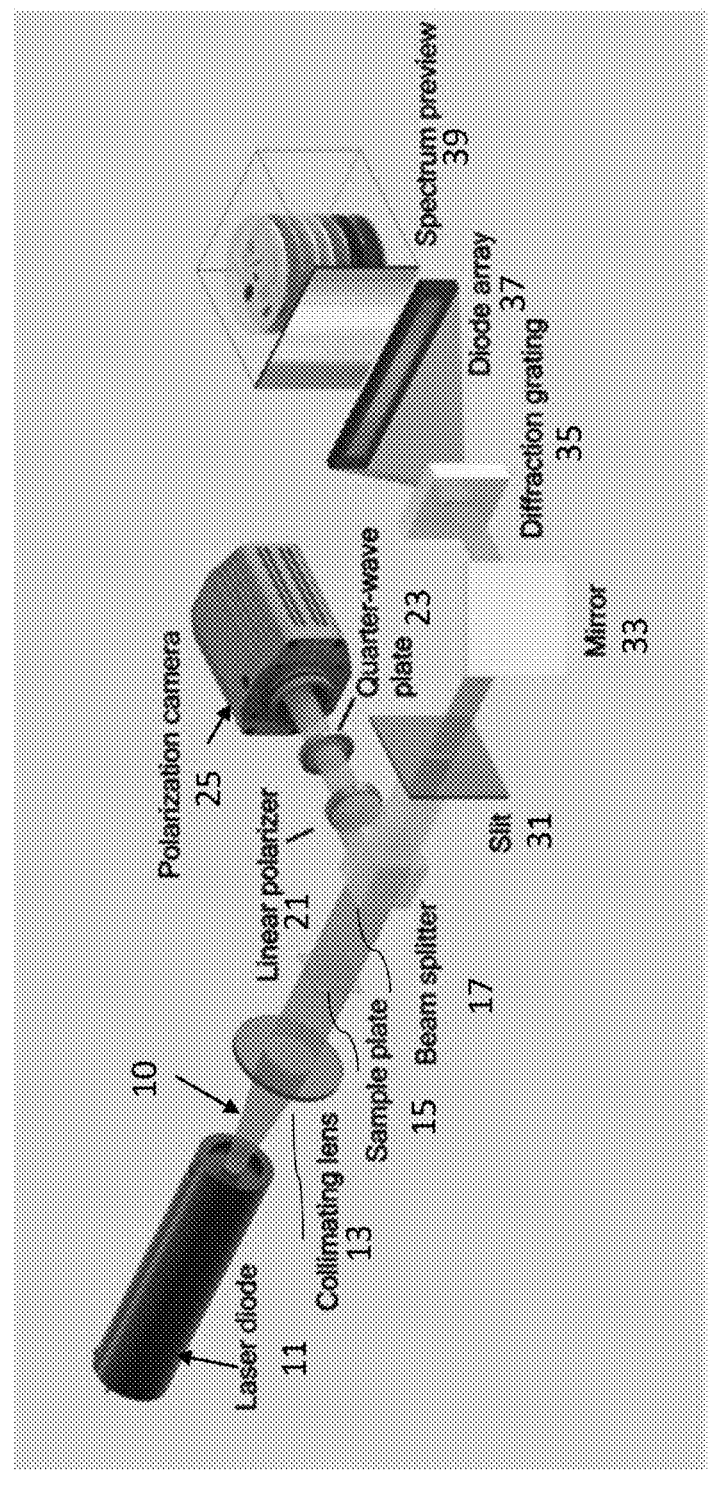
FIG. 1A is a schematic diagram of the system according to the present invention and FIG. 1B shows the in-line holographic portion thereof.

A schematic of the apparatus of the system of the present invention is shown in FIG. 1A. The system can innovatively record the polarization-sensitive holographic patterns and the spectrum of a specimen, simultaneously. In an exemplary embodiment the laser light 10, coming from a laser source 11, has a wavelength of 532 nm and is first collimated by a collimating lens 13. After the laser light passes through the sample object on sample plate 15, the object information is encoded with the laser wavefront. The object light wave is then separated into two optical paths by a beam splitter 17.

Figure 1B:
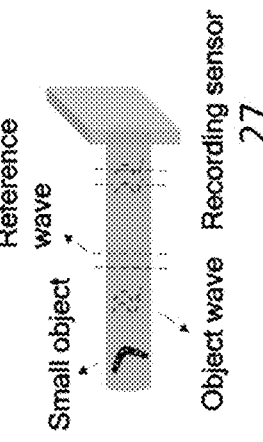

In the setup in FIG. 1A, a holographic imaging system is implemented with an in-line setup. A reference light wave and an object light wave use the same light path as shown in FIG. 1B. Part of the light, with a plane wavefront coming from the light source, goes through the sample and forms the object light wave. The other part of the plane wave is the plane reference light wave. The holographic image is formed at the sample plate 15 in FIG. 1 and is recorded at the sensor 27. One path of object light interferes with the plane reference light and forms the holographic images. In particular, a source of collimated laser light impinges on a sample plate having sample particles mounted thereon. The light passing through the sample forms an object wave and the light not passing through the sample forms a reference wave which interferes with the object wave to form a holographic image at the sample plate.

From the beam splitter 17 a first light path passes through a linear polarizer 21 and then a quarter-wave plate 23 to a specific polarization camera 25. This camera is utilized to replace a prior art charge-coupled device (CCD) or complementary metal oxide semiconductor (CMOS) camera for Full Stokes holographic image recording. The other light path from the beam splitter successively goes through an entrance or aperture slit 31 to form a line of light that is dispersed by a diffraction grating 35 after being reflected onto the grating by mirror 35. The diffraction grating forms a 2D spectrum that is captured on diode array 37. The mirror is put in the optical path to increase the system's compactness by folding the light.

Figure 2:
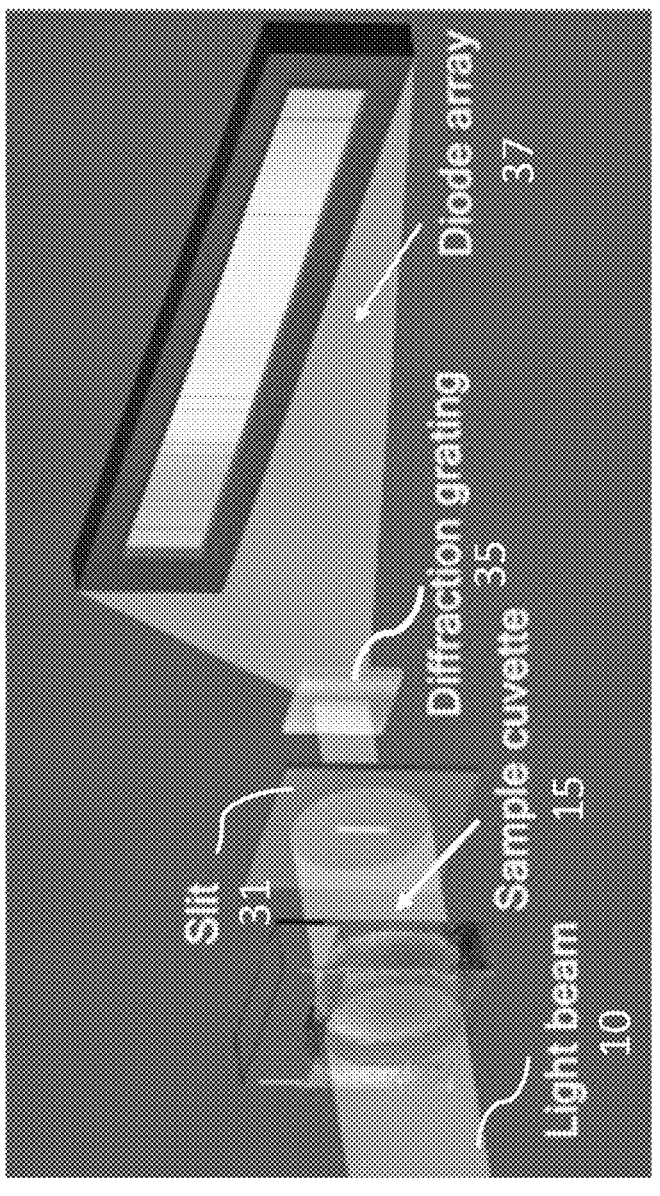
FIG. 2 is a schematic diagram of the working principle for absorption spectrum formation.

As seen in FIG. 2 the light beam 10 goes through the sample plate 15 or cuvette, which is a straight-sided, optically clear container for holding liquid samples in a spectrophotometer. Part of the light beam is absorbed and scattered by the molecules of the liquid sample. After that, the light beam is filtered by the slit 31 and dispersed by the diffraction grating 35 as also shown in FIG. 1A. The diode array 37 receives the dispersed light from the grating 35 and is set for recording the spectrum of the light after having passed through the sample. FIG. 2 differs from part of FIG. 1 in that it does not show the use of mirror 33 to make the layout more compact.

The spectrum is a graphical representation of the light response as a function of wavelength, which provides insight into the structure and properties of sample materials. Absorption spectroscopy involves shining UV or visible light onto a sample and observing its response to this stimulus. When an atom or molecule absorbs a photon of light, it gains energy from the absorbed particle. This can induce a transition of the particle to a higher energy level or an excited state, which requires the absorbed photon's energy to match the difference in energy between the ground state and the excited state of the absorbing particle. Therefore, only photons with specific energies or wavelengths can be absorbed.

The absorption spectrum is obtained by measuring the amount of light absorbed by a sample as a function of its wavelength or frequency. This provides valuable insights into the electronic structure and energy levels of the absorbing particles. In particular, the absorption spectrum is a valuable tool for identifying specific atoms or molecules in a sample and determining their energy levels and transition probabilities. It is widely utilized in the fields of chemistry, physics, and biology to investigate material properties and identify unknown substances.

Figures 3A, 3B:
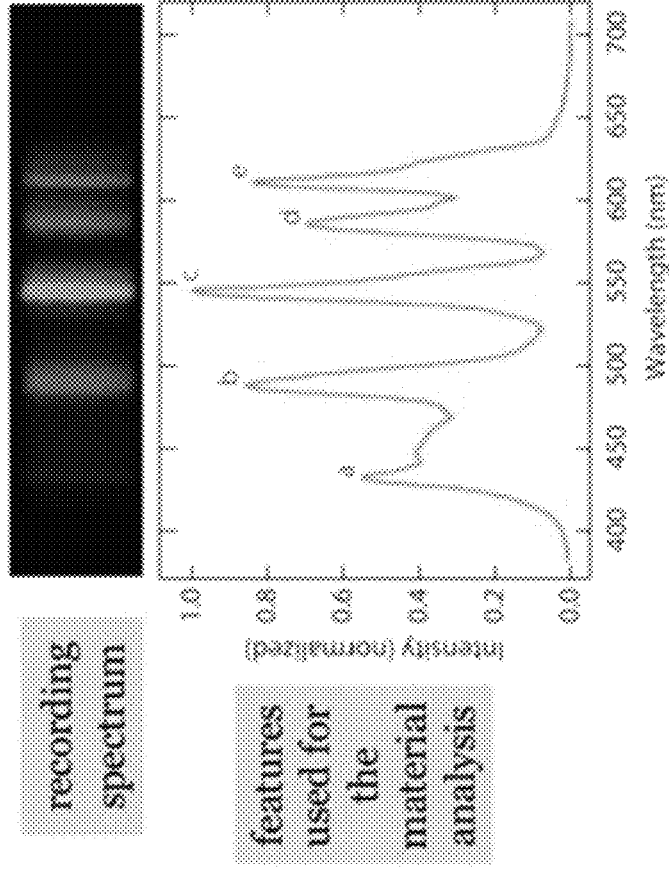
FIG. 3A is an image of a recorded color spectrum according to the present invention and FIG. 3B is a graph of extracted spectrum features.

FIG. 3A shows the recorded spectrum, wherein the different colors represent different light wave frequencies or wavelengths. FIG. 3B shows a graph of the wavelength positions of the wave peaks.

By utilizing a spectrophotometer or an imaging sensor, the intensity of light that is transmitted through a sample is measured as it varies with wavelength. The absorption spectrum can be obtained by subtracting the intensity of the transmitted light from that of the incident light and plotting this result as a function of wavelength.

Beer-Lambert's law is the ground principle for the calculation of the sample absorbance. Absorbance is defined as the negative base 10-logarithm of the sample transmission. Mathematically, $$\text{Transmission} = T \equiv \frac{I_{sample}}{I_{origin}}, \tag{1}$$

$$\text{Absorbance} = A \equiv -\log_{10}(T) = -\log_{10}\left(\frac{I_{sample}}{I_{origin}}\right), \tag{2}$$

where $I_{origin}$ and $I_{sample}$ are the light intensity before and after going through the sample. Beer-Lambert's law describes a relationship between the sample absorbance (A), the ability to absorb light of a specified wavelength, and its absorptivity ($\varepsilon_A$), the degree to which it absorbs energy, defined as $$A = \varepsilon_A \cdot L \cdot c, \tag{3}$$

where L is the optical path distance between the sample and c is the sample concentration. $\varepsilon_A$ is expressed with units of $L \cdot mol^{-1} \cdot cm^{-1}$ and c has a unit of $mol \cdot L^{-1}$.

Figure 4:
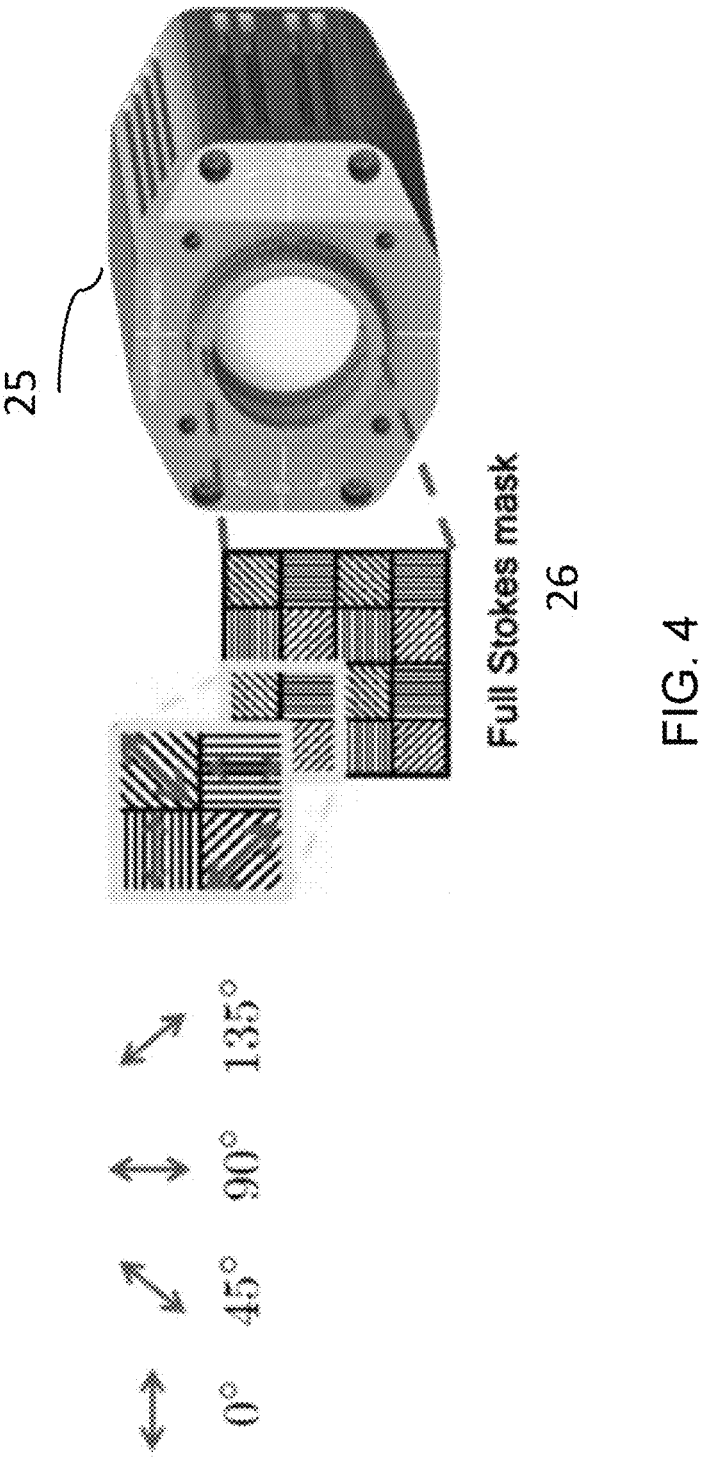
FIG. 4 is a diagram of the working principle of the polarization imaging apparatus part of the apparatus of the present invention with a Stokes mask.

The working principle of the specific polarization camera with a Stokes mask 26 is shown in FIG. 4. The Stokes mask 26 is put inside the polarization camera 25 and before the imaging sensor 27 (FIG. 1B) in the camera. The image of the Stokes mask, which in the drawing is shown in front of the camera in FIG. 4, but which is actually inside it, is an enlarged image so as to explain how the Stokes mask is manufactured and works. The yellow boxes give a zoomed-in image of four-cells in the Stokes mask which have respective polarization states with 0 degree, 45 degrees, 90 degrees, and 135 degrees for each cell in the Stokes mask. Thus, the light from the sample image will pass to a cell of the sensor depending on its polarization.

By using the system of the present invention, rich polarization features of the detected samples can be captured and are helpful for birefringence and material analysis. The working principle is described as follows. The Jones matrix of a non-depolarizing specimen is described as $$J_s = \begin{bmatrix} \cos\frac{\phi}{2} - i\sin\frac{\phi}{2}\cos 2\Theta & -i\sin\frac{\phi}{2}\sin 2\Theta \\ -i\sin\frac{\phi}{2}\sin 2\Theta & \cos\frac{\phi}{2} + i\sin\frac{\phi}{2}\cos 2\Theta \end{bmatrix} \tag{4}$$

where $\phi$ is the phase retardation and $\Theta$ defines the optical optic-axis orientation. In the system of the present invention, the information of 4 polarization states is recorded, which are 0°, 45°, 90° and 135° states. The recorded raw light intensity in each of the polarization states is denoted as $$I_{0°} = \frac{1}{2}(1 - \sin\phi\sin 2\Theta) \tag{5}$$

$$I_{45°} = \frac{1}{2}(1 + \sin\phi\cos 2\Theta) \tag{6}$$

$$I_{90°} = \frac{1}{2}(1 + \sin\phi\sin 2\Theta) \tag{7}$$

$$I_{135°} = \frac{1}{2}(1 - \sin\phi\cos 2\Theta) \tag{8}$$

Two dummy variables for a simplified expression are defined as $$\varepsilon_1 = \sin\phi\sin 2\Theta \tag{9}$$

$$\varepsilon_2 = \sin\phi\cos 2\Theta \tag{10}$$

The phase retardation and optic-axis orientation of the specimen are rewritten as $$\phi_s = \sin^{-1}\sqrt{\varepsilon_1^2 + \varepsilon_2^2} \tag{11}$$

$$\Theta_s = \frac{1}{2}\tan^{-1}\left(\frac{\varepsilon_1}{\varepsilon_2}\right) \tag{12}$$

Figure 5:
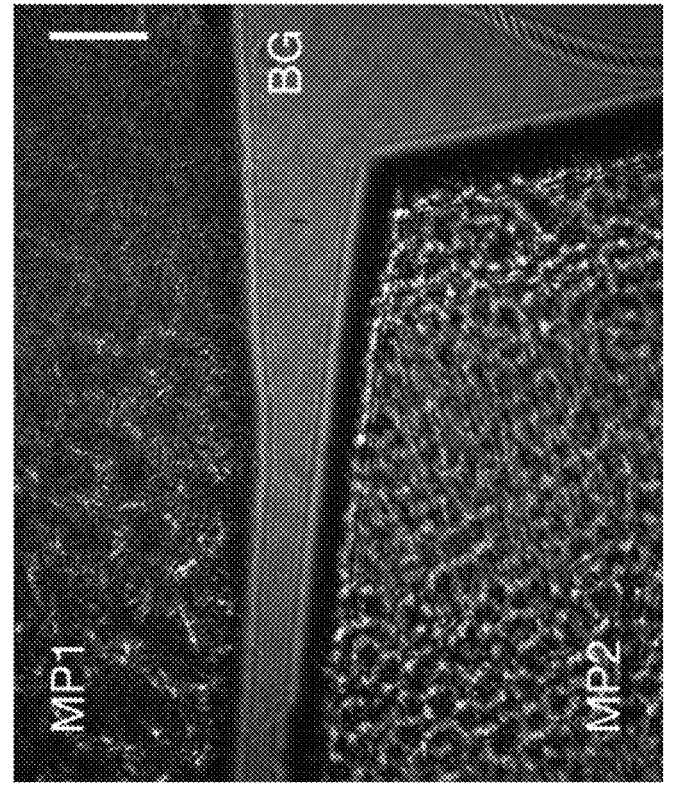
FIG. 5 is a visualization of the holographic patterns of a test specimen.

Holographic patterns enclose the structural and refractive index information of the detected samples. FIG. 5 shows the recorded holographic sample image. MP1 represents a microplastic sample 1, MP2 represents a microplastic sample 2 and BG represents the background region in which there is no sample. The spatial and phase difference between the interference of MP1 and MP2 exists in the intensity difference, holographic fringe contrast and holographic fringe patterns. The spatial and phase difference between the two interference fringes discloses the refractive index, structural, and surface information of the specimen. In FIG. 5 the scale bar: 0.5 mm.

Figure 6:
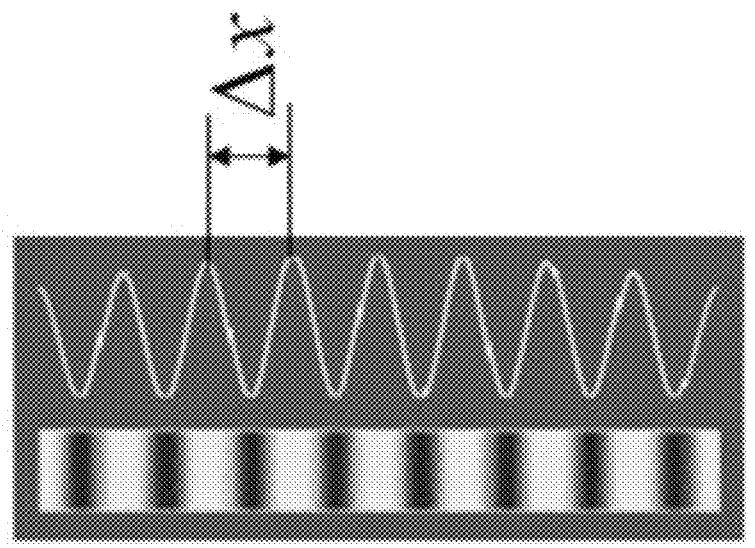
FIG. 6 is a diagram for holographic patterns and the spatial difference between two fringes.

The light intensity distribution of a holographic fringe pattern is shown in FIG. 6. This pattern relates to $$H = 4I_c\cos^2\left(\frac{kd}{2D}x'\right) \tag{13}$$

where x' is the horizontal position of the fringes in the imaging plane in Cartesian coordinates. $I_c$ is the light intensity of the central bright spot. k defines the wave number. D is the distance between the light source and imaging plane. d is the distance between two light waves. In the imaging plane, as shown in the FIG. 6, the distance between two fringes is denoted as $$\Delta x = \frac{D}{d}\frac{\lambda}{n} \tag{14}$$

For an optical system, a light source with one wavelength is used. For an imaging plane at a certain distance, the displacement between two holographic fringe patterns solely depends on the specimen refractive index n.

Figure 7:
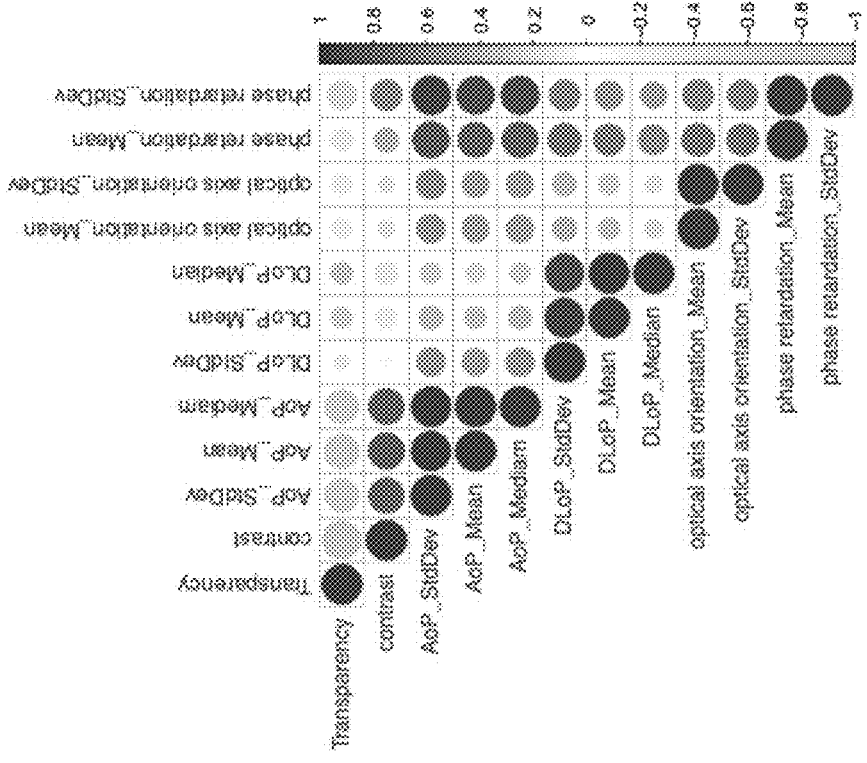
FIG. 7 is a correlation matrix for the polarization, holographic, textual, spectrum, and morphological features.

The recorded polarization holographic images and spectrum are processed by machine learning and deep learning methods for automatic and deep feature extraction and material analysis. A correlation matrix for part of the features is shown in FIG. 7. In FIG. 7 the vertical axis corresponds to the correlations between the features where −1 refers to negative correlation and 1 refers to positive correlation. The color and size of the circles in FIG. 7 represent the value of the correlation where the darker the color and the bigger of the circle, the stronger the correlation.

The features in FIG. 7 show high independence and offer rich information for material identification. In particular, the correlation matrix shown in FIG. 7 demonstrates part of the features which are extracted from the raw image data. These features include polarization related (phase retardation Mean, phase retardation StdDev, etc.), holographic (contrast, etc.), and spectroscopic-related characters. Relatively high independences are shown among the feature categories. Extracted image features are used for further category classifications.

Figure 8:
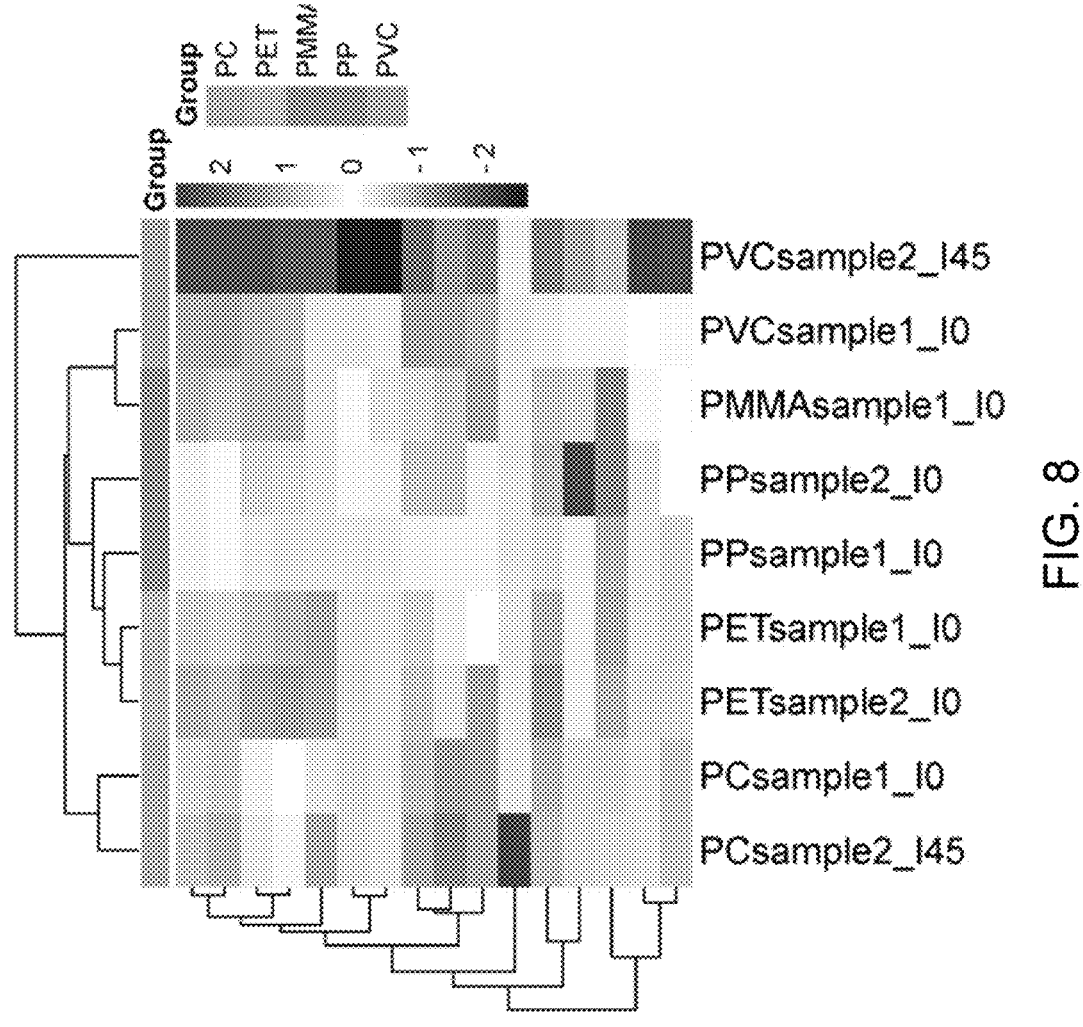
FIG. 8 is a classification confusion matrix for a pilot study of the material analysis methods and apparatus of the present invention.

The confusion matrix of FIG. 8 shows the results of a pilot study of the material analysis methods and apparatus of the present invention. It demonstrates the classification result among different microplastic samples and categories. The study specimen materials that were selected are polycarbonate (PC), polyethylene terephthalate (PET), polymethyl methacrylate (PMMA), polypropylene (PP), and polyvinyl chloride (PVC). In FIG. 8 the color bar refers to the classification category. −2 to 2 gives 5 categories, representing 5 microplastic categories (PC, PET, PMMA, PP, PVC).

The last five lines of the matrix also have group relationships. The color and intensity show their relationship. The classification confusion matrix of FIG. 8 demonstrates the outstanding properties for material analysis with the system of the present invention.

The above are only specific implementations of the invention and are not intended to limit the scope of protection of the invention. Any modifications or substitutes apparent to those skilled in the art shall fall within the scope of protection of the invention. Therefore, the protected scope of the invention shall be subject only to the scope of protection of the claims.

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A two-dimensional spectrum recording apparatus comprising:

a source of collimated laser light impinging on a sample plate with a sample mounted on it, the light passing through the sample forming an object wave, the light not passing through the sample forming a reference wave which interferes with the object wave to form a holographic image at the sample plate;

a beam splitter receiving the collimated laser light after it has passed through the sample and forming separate first and second beams of light;

a linear polarizer receiving the first beam of light;

a polarization camera having a Full Stokes mask at its input and receiving the first beam of light after it has passed through the linear polarizer, said polarization camera recording the light that passes through the Stokes mask;

a slit aperture receiving the second beam of light and transforming it into a slit of light;

a diffraction grating receiving the second beam of light after it has passed through the slit aperture; and a diode array receiving the second beam of light after it has passed through the diffraction grating and formed a light spectrum that is recorded.

2. The two-dimensional spectrum recording apparatus of claim 1 wherein the collimated laser light source is a laser diode that generates a beam of laser light and a collimating lens that receives the laser light and converts it into a collimated laser light beam.

3. The two-dimensional spectrum recording apparatus of claim 1 further including a mirror located after the slit aperture to bend the second beam into parallel with the first beam in order to make the structure more compact.

4. The two-dimensional spectrum recording apparatus of claim 1 wherein the Stokes mask is a series of four cell groups with each having a polarization of 0°, 45°, 90° and 135° respectively.

5. The two-dimensional spectrum recording apparatus of claim 4 wherein the second beam of light passes through a linear polarizer after the beam splitter and through a quarter-wave plate after the linear polarizer and before the polarization camera.

6. The two-dimensional spectrum recording apparatus of claim 1 wherein a recorded holographic microplastic sample 1 (MP1) and a holographic microplastic sample 2 (MP2) are formed and the spatial and phase difference between the interference of MP1 and MP2 exists in the intensity difference, contrast in the holographic fringes and patterns of holographic fringes, and the spatial and phase difference between the two interference fringes discloses the refractive index, structural, and surface information of the specimen.

* * * * *